United States Patent
Pein

(10) Patent No.: US 8,781,935 B1
(45) Date of Patent: *Jul. 15, 2014

(54) METHOD AND SYSTEM FOR DEVELOPING AND APPLYING MARKET DATA SCENARIOS

(71) Applicant: Howard Barry Pein, Harrison, NY (US)

(72) Inventor: Howard Barry Pein, Harrison, NY (US)

(73) Assignee: CodeStreet, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/189,396

(22) Filed: Feb. 25, 2014

Related U.S. Application Data

(60) Division of application No. 13/441,524, filed on Apr. 6, 2012, now Pat. No. 8,671,042, which is a continuation of application No. 11/942,372, filed on Nov. 19, 2007, now Pat. No. 8,175,941.

(51) Int. Cl.
*G06Q 40/00* (2012.01)

(52) U.S. Cl.
USPC .............. 705/35; 705/36 R; 705/37; 705/20

(58) Field of Classification Search
CPC .......................................... G06Q 40/00–40/08
USPC ............................................. 705/35–37, 20
See application file for complete search history.

(56) References Cited

U.S. PATENT DOCUMENTS

| | | | | |
|---|---|---|---|---|
| 5,774,880 A * | 6/1998 | Ginsberg | ..................... | 705/36 R |
| 5,987,432 A * | 11/1999 | Zusman et al. | .................. | 705/35 |
| 8,175,941 B2 * | 5/2012 | Pein | ............................... | 705/35 |
| 8,346,646 B2 * | 1/2013 | Cutler et al. | ................ | 705/36 R |
| 8,671,042 B2 * | 3/2014 | Pein | ................ | 705/35 |
| 2010/0138360 A1 * | 6/2010 | Cutler et al. | ................ | 705/36 R |
| 2010/0312681 A1 * | 12/2010 | Sogo et al. | ..................... | 705/35 |
| 2013/0124382 A1 * | 5/2013 | Cutler et al. | .................... | 705/37 |

* cited by examiner

*Primary Examiner* — Narayanswamy Subramanian
(74) *Attorney, Agent, or Firm* — Thompson Hine L.L.P.

(57) ABSTRACT

A method for developing and applying market data scenarios may include receiving market data by a record and replay daemon executing on a computer system; storing the received market data in a storage device; replaying the stored market data; changing the stored market data with respect to at least one asset by applying in an automated manner a contrived market activity scenario selected from a plurality of different scenarios stored on the computer system, whereby performance of at least one specific asset is changed to a contrived performance to simulate market activity desired by a user to create a contrived market activity scenario; and transmitting the contrived market activity scenario to a client application, which is able to process the contrived market activity scenario as if it were market data transmitted directly from the market data distribution platform.

18 Claims, 5 Drawing Sheets

```
┌─────────────────────────────────────────────────────────────────────────────┐
│ ○ Edit Transformation                                                     ⊠ │
│ Select Transformation or Groovy Script:                                     │
│ ┌─────────────────────────────┐ ┌─────────────────────────────────────────┐ │
│ │ Find            [   ]  ▽ △  │ │ <script>-<! [CDATA]                     │ │
│ ├─────────────────────────────┤ │ // Adds 2 percent to the BID price, keeping the original spread │ │
│ │ ⊞ ▭ XML Mapping             │ │ if( rec.BID && rec.ASK ) {              │ │
│ │ ⊟ ▭ Groovy Scripting        │ │   spread = rec.ASK--rec.BID  // 1 only if the record contains BID │ │
│ │   ⊞ ▭ Foreign Exchange  90  │ │   rec.BID=rec.BID*1.02       // compute the spread │ │
│ │   ⊞ ▭ Fixed Income          │ │   rec.ASK=rec.BID+spread     // add 2 percent to the BID │ │
│ │   ⊟ ▭ Equities              │ │ }                            // 1 adjust ASK │ │
│ │      • [add 2 percent to BID/ASK] │ │ ] ></script>                  92        │ │
│ │      • script template      │ └─────────────────────────────────────────┘ │
│ │      • script template with static initialization │ [Add Transformation] [Undo]        [Load Transformation] │
│ │ ⊞ ▭ Saved Transformations   │                                             │
│ └─────────────────────────────┘      98    100                     96      │
│ <script>-<! [CDATA]                                                         │
│ // Adds 2 percent to the BID price, keeping the original spread             │
│ if( rec.BID && rec.ASK ) {                          94                      │
│   spread = rec.ASK--rec.BID   // 1 only if the record contains BID          │
│   rec.BID=rec.BID*1.02        // compute the spread                         │
│   rec.ASK=rec.BID+spread      // add 2 percent to the BID                   │
│ }                             // 1 adjust ASK                               │
│ ] ></script>                                                                │
│                                                                     102     │
│  88  ⇔                                                                      │
│ Input Sample: 5 records, 31 fields   Sample Size: [5] ▽                     │
│ │ subject         │ time                        │ ASK  │ASKSIZE│ BID  │BIDSIZE│TRDPRC_1│TRDVOL_1│ │
│ │ IDN_RDF.ANY.MRVL.0│2007-08-27T14:35:28.505    │15.33 │ 76    │15.32 │130    │        │        │ │
│ │ IDN_RDF.ANY.INTC.0│2007-08-27T14:35:29.044    │      │       │      │       │ 24.63  │ 400    │ │
│ │ IDN_RDF.ANY.MSFT.0│2007-08-27T14:35:29.045    │28.55 │286    │28.54 │ 60    │        │        │ │
│ │ IDN_RDF.ANY.INTC.0│2007-08-27T14:35:29.045    │      │       │      │       │ 24.63  │1500    │ │
│ │ IDN_RDF.ANY.INTC.0│2007-08-27T14: 35:29.046   │24.64 │319    │24.63 │483    │        │        │ │
│ Transformed: 5 records, 31 fields    ✓ Data check: ok           104         │
│ │ subject         │ time                        │ ASK    │ASKSIZE│ BID    │BIDSIZE│TRDPRC_1│TRDVOL_1│ │
│ │ IDN_RDF.ANY.MRVL.0│2007-08-27T14:35:28.505    │15.6364 │ 76    │15.6264 │130    │        │        │ │
│ │ IDN_RDF.ANY.INTC.0│2007-08-27T14:35:29.044    │        │       │        │       │ 24.63  │ 400    │ │
│ │ IDN_RDF.ANY.MSFT.0│2007-08-27T14:35:29.045    │29.1208 │286    │29.1108 │ 60    │        │        │ │
│ │ IDN_RDF.ANY.INTC.0│2007-08-27T14:35:29.045    │        │       │        │       │ 24.63  │1500    │ │
│ │ IDN_RDF.ANY.INTC.0│2007-08-27T14: 35:29.046   │25.1326 │319    │25.1226 │483    │        │        │ │
│                                                           [Save] [Cancel]   │
│                                                            106    108       │
└─────────────────────────────────────────────────────────────────────────────┘
                                 FIG. 3
```

METHOD AND SYSTEM FOR DEVELOPING AND APPLYING MARKET DATA SCENARIOS

TECHNICAL FIELD

The disclosure relates to methods and systems for working with real-time, streaming data, and more particularly to methods and systems for manipulating real-time, streaming market data to create artificial market data scenarios.

BACKGROUND

There is an increasing need to process real-time market data electronically for multiple purposes, such as, for example, determining prices of securities, placing orders for the purchase or sale of securities automatically, and for measuring risk within a portfolio of securities. Typically, such software applications receive market data from a commercially available market data service and produce a variety of outputs based on the incoming market data scenario. The purposes of this market data processing software can be wide ranging and the software potentially can react to a wide range of market data scenarios, such as a change in a treasury bill yield curve or a change in a relationship between the prices of two securities.

A problem inherent with the development of such market data processing software applications is that it is difficult to verify in advance of actual use of the software application that the application will react appropriately in response to a detected market condition. Currently, the only way to test the performance of such market data processing software is to wait for the desired market condition to occur, and then observe the behavior of the software in response to it.

SUMMARY

The disclosed method and system enable the automated build and test of market data processing software applications by providing precise market data scenarios that may be applied to the market data processing software applications as a test with an expected, precise result that can be monitored for pass or failure. By providing automated market data scenarios to securities trading applications, testing of the accuracy and reliability of such market data processing applications may be simplified.

In one embodiment, a method for developing and applying market data scenarios may include providing a computer system; receiving by a record and replay daemon executing on the computer system market data from a market data distribution platform; storing the received market data in a storage device operating on the computer system; replaying the stored market data the record and replay daemon; changing the stored market data by the record and replay daemon with respect to at least one specific asset included in the market data by applying in an automated manner a contrived market activity scenario, not reflective of actual market activity, to the stored market data with respect to the at least one specific asset, including entering at least one parameter directed to the at least one specific asset, whereby performance of the at least one specific asset is changed from performance of the at least one specific asset in the stored received market data to a contrived performance of the at least one specific asset, the contrived market activity scenario being selected from a plurality of different contrived market activity scenarios stored on the computer system, whereby at least one value of the at least one stored specific asset is changed to simulate market activity desired by a user to create contrived market data with respect to the at least one specific asset; and transmitting by the record and replay daemon the contrived market data with respect to the at least one specific asset to a client application, whereby the client application is able to process the contrived market data with respect to the at least one specific asset as if it were market data transmitted directly from a market data distribution platform.

In another embodiment, a system for developing and applying market data scenarios may include a computer system; a record and replay daemon executing on the computer system and adapted to receive market data from a market data distribution platform; a storage device executing on the computer system and adapted to store the market data received by the record and replay daemon; the record and replay daemon adapted to replay the market data stored in the storage device; the record and replay daemon adapted to change the market data stored in the storage device with respect to at least one specific asset included in the market data by applying in an automated manner a contrived market activity scenario, not reflective of actual market activity, to the stored market data with respect to the at least one specific asset, including entering at least one parameter directed to the at least one specific asset, whereby performance of the at least one specific asset is changed from performance of the at least one specific asset in the stored received market data to a contrived performance of the at least one specific asset, the contrived market activity scenario being selected from a plurality of different contrived market activity scenarios stored on the computer system, whereby at least one value of the at least one stored specific asset is changed to simulate market activity desired by a user of the computer system to create contrived market data with respect to the at least one specific asset; and the record and replay daemon may be adapted to transmit the contrived market data with respect to the at least one specific asset to a client application, whereby the client application is able to process the contrived market data with respect to the at least one specific asset as if it were market data transmitted directly from the market data distribution platform.

Other objects and advantages of the disclosed method and system for applying market data scenarios will be apparent from the following description, the accompanying drawings and the appended claims.

BRIEF DESCRIPTION OF THE DRAWINGS

FIG. 3 is a screen shot showing a transformation panel that is part of the graphical user interface of the market data simulator of FIG. 1;

DETAILED DESCRIPTION

Figure 1:
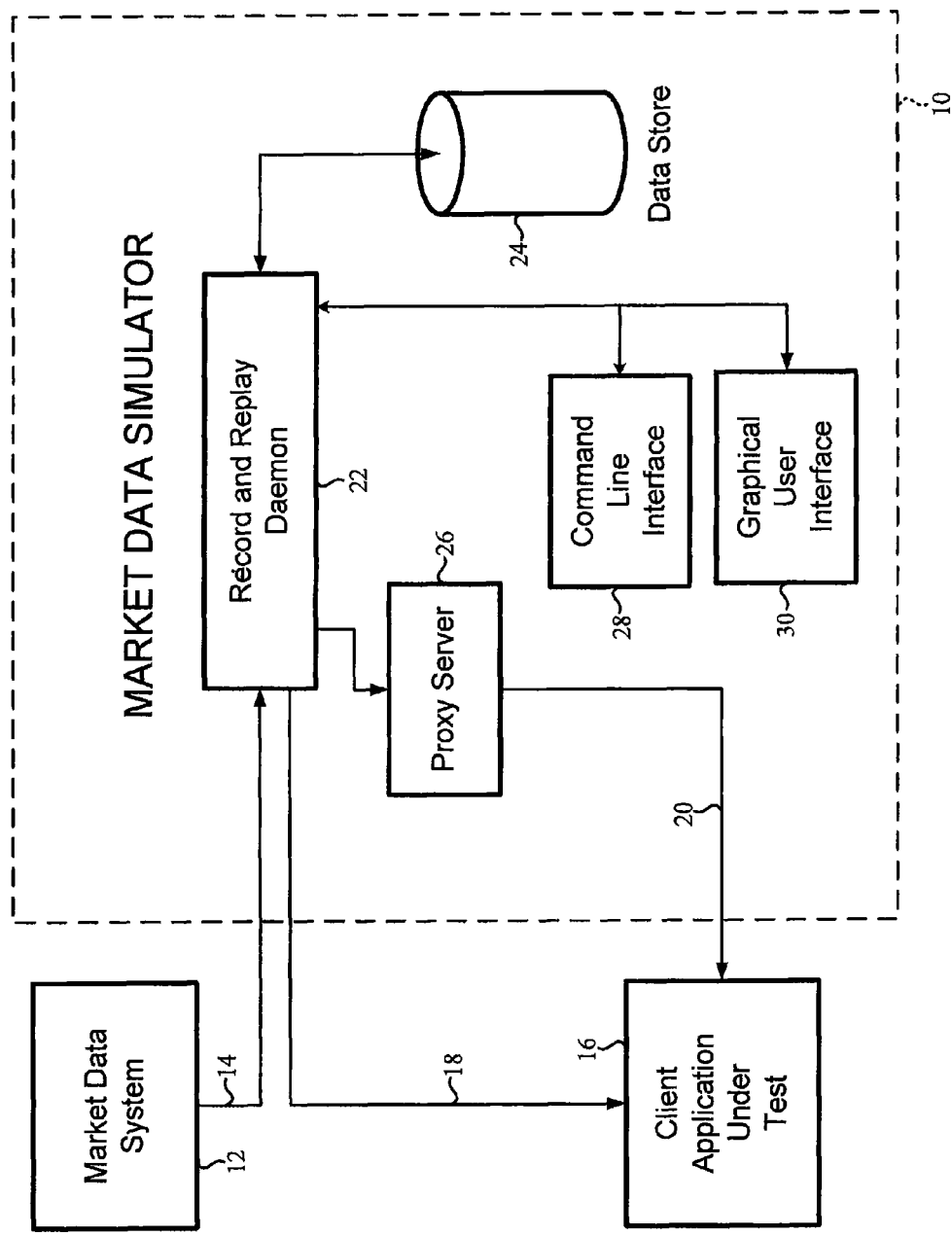
FIG. 1 is a schematic diagram of the disclosed system for developing and applying market data scenarios.

As shown in FIG. 1, in one embodiment the market data simulator, generally designated 10, may provide an environment for building, testing, evaluating, demonstrating and analyzing software systems that consume real-time market data. The simulator 10 may receive a stream of market data in real time from a market data system 12, preferably a commercially available market data service, over a network 14, such as the Internet. The simulator 10 may modify or change the market data received from the market data system 12 and may transmit the changed data to a client application under test 16 over networks 18 or 20.

The market data simulator 10 may include a record and replay daemon 22, a data store 24, a client application interface that may take the form of a proxy server 26, and a user interface module that may take the form of a command line interface 28 and/or a graphical user interface 30. The command line interface 28 and graphical user interface 30 may be connected to pass command messages to the record and replay daemon 22 either to record or replay data received from the market data system 12. The record and replay daemon 22 may, in turn, respond with status messages to the command line interface 28 or graphical user interface 30. The exchange of data between the graphical user interface 30 and command line interface 28, and the record and replay daemon 22, may utilize messaging protocols such as the TIBCO Rendezvous messaging protocol (available from TIBCO Software Inc.). However, other messaging protocols may be used as well.

When either the command line interface 28 or graphical user interface 30 instructs the record and replay daemon 22 to record data, the daemon may begin to record the specified data from the market data system 12 received over network 14. This data may be transferred to and stored in non-volatile storage, which in an embodiment may include data store 24. Preferably, data store 24 is a hierarchical directory of flat files with binary encoding that are linked together as a chain of files. These files may be stored within directories, which are in turn stored within directories, allowing for essentially an unlimited amount of data to be recorded, the only limit being the physical data storage capabilities of data store 24.

Once data is stored within data store 24, it may be manipulated by the market data simulator 10 to form arbitrary market data scenarios. This may be accomplished by passing the data from the data store 24 through the record and replay daemon 22 to the user interface, which in an embodiment may include graphical user interface 30. The graphical user interface 30 may transform the data appropriately, based upon the request of a user of the simulator 10, and then send the manipulated data back to the record and replay daemon 22 for storage in the data store 24. This contrived scenario of manipulated or changed data may be replayed on demand to the application under test 16.

With the configuration shown in FIG. 1, the command line interface 28 and graphical user interface 30 may be developed as Java applications. The record and replay daemon 22 may be implemented on a C++ server.

The market data simulator 10 may provide data from the record and replay daemon 22 to the application under test 16 through the client application interface, which in an embodiment may include either or both of two paths, depending on the type of distribution system being emulated by the simulator during playback. For example, if it is desired to use the simulator 10 to simulate a multicast or broadband-based distribution system, then the client application interface may employ the record and replay daemon 22, such that data may flow directly from the record and replay daemon over network 18 to application under test 16. Alternately, if it is desired to use the simulator 10 to simulate a point-to-point distribution platform, then the client application interface may employ proxy server 26, such that altered market data may flow from the record and replay daemon 22, through the replay proxy server 26 into the application under test 16 over network 20. It should be noted that it is within the scope of the disclosure to provide the application under test 16 in the same computer system as the simulator 10, thereby eliminating the need for network connections 18, 20.

The application under test 16 thus may be able to perform as if it were subscribing directly to one of the two distribution modes of the market data system 12. Accordingly, the market data simulator 10 may be entirely transparent to the application under test 16. While FIG. 1 shows two different distribution modes, it is within the scope of this disclosure to provide a wide range of distribution components from a variety of vendor distribution platforms without affecting the structure or operation of the simulator 10.

Figure 2:
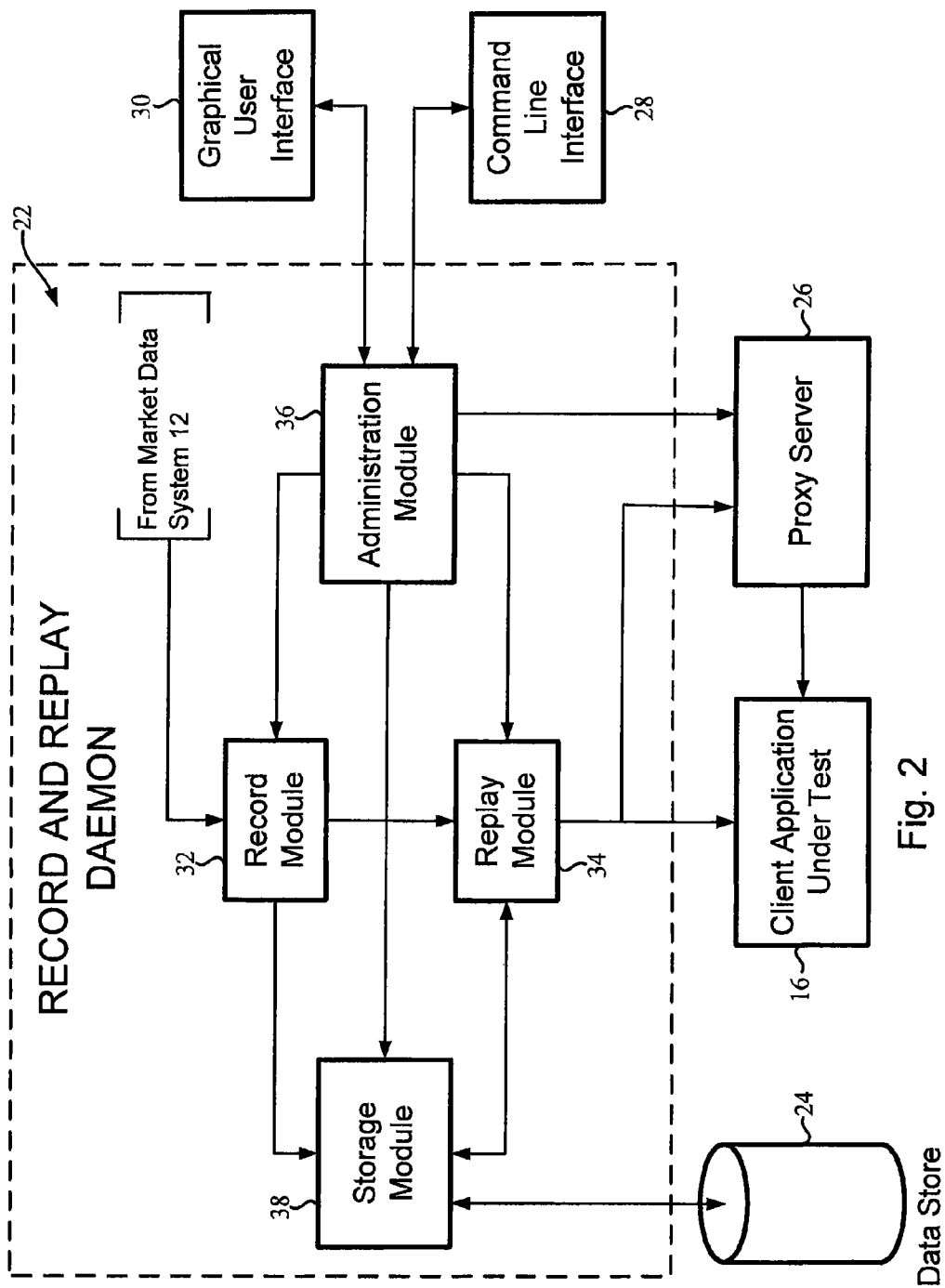
FIG. 2 is a schematic of the record and replay daemon of the system shown in FIG. 1.

As shown in FIG. 2, the record and replay daemon 22 may include subcomponents such as a record module 32, replay module 34, administration module or interface 36, and storage module or interface 38. The administration module 36 may receive commands from graphical user interface 30 or command line interface 28.

The storage module 38 may communicate with data store 24. The storage module 38 may store data in the data store 24 in the form of binary message blobs. The content of messages is extracted and stored along with associated header and index data. Storage module 38 may receive market data from record module 32 and store the market data in data store 24. The storage module 38 also may retrieve modified or altered market data from data store 24.

The record module 32 may record information from the market data system 12. The record module 32 may be provided a series of symbols to record and the record module may make subscription requests for each symbol. The record module 32 may record both update values, which only include fields that have changed, as well as initial value records that may be stored periodically in data store 24, so an entire record may be created during a replay. The record module or interface 32 may communicate with a market data distribution platform, such as the market data system 12, for recording data from that platform. In a preferred embodiment, the record module 32 may be built using a market data subscription API (application programming interface) used to subscribe to market data from a market data distribution platform. In such an embodiment, the Reuters or MDS, Triarch and TIB platforms may be supported, but other platforms could be supported as needed.

Replay module 34 may communicate with storage module 38 to retrieve data from data store 24 for modification. Alternately, replay module 34 may receive real-time data from record module 32 that in turn receives the market data from the market data system 12. The replay module 34 is the interface through which market data is replayed. The replay module 34 mimics the semantics of a market data distribution platform, such as market data system 12, so that the client application under test 16 subscribing to the replay module 34 is unable to distinguish between the replay module 34 and the actual market data system 12.

The replay module 34 may use the publication APIs from market data vendors, such as Reuters, to simulate the vendor's market data platform. The replay module 34 may replay, by way of a command line or GUI command received from command line interface 28 or graphical user interface 30, respectively, a previously recorded or created data stream of market data, either from data store 24 or directly from record module 32. By use of the graphical user interface 30 or command line interface 28, a user may specify changes to the replay stream received from data store 24 or record module 32.

Such changes may include accelerating or decelerating the update rate, pausing and inserting custom updates, injecting error conditions and manipulating the overall update stream through programmatic means. By use of the graphical user interface 30, a user may specify and apply custom functions that manipulate the replayed data in a variety of ways. For example, a user may plot pricing data for a series of bonds, and then adjust the yield for this set of bonds by, in effect, manipulating points along a graph. Manipulating a single point in the graph may then be applied to a range of updates over a period of time. For example, recorded data might include a series of on-the-run United States treasury bonds. By taking a moment in time and reflecting the yield for the latest update for bonds of each maturity along the yield curve, a user may drag and drop or specify directly a change in the yield curve. This, in turn, may lead to a change in all relevant values within relevant updates over a specified interval. Consequently, a user may be able to shift the yield curve over a trading day of recorded market data, and all associated fields for all symbols should be appropriately adjusted.

Similarly, functions may be provided to shift foreign exchange rates, equity prices, options and a wide variety of financial assets for which market data is provided. Once such market data scenarios have been created, the market data scenarios may be stored under a unique name by transmitting the manipulated data from replay module 34 to storage module 38 for storage in data store 24. Such stored scenarios may then be applied against applications in an automated manner, allowing a large regression suite to be developed that can be applied automatically.

When a client application under test 16 attaches to the market data simulator 10 (see FIG. 1) it may retrieve the appropriate initial value snapshot to initialize itself that reflects the relevant moment in time within the replay stream. The client application under test 16 may do so because the system 10 consistently maintains snapshots of the complete market data record at periodical intervals throughout the recording interval in data store 24.

The administration module 36 may transmit control messages to start and stop replays and recordings by replay module 34 and record module 32, respectively. Administration requests may be communicated from the graphical user interface 30 or command line interface 28 to the administration module 36. The administration module 36 also may pass the request to the record module 32 and replay module 34. As shown in FIG. 2, the administration module 36 also may transmit requests to the storage module 38, and such requests may include instructions to be transmitted to the data store 24 to purge itself or perform other necessary maintenance operations. In a preferred embodiment, the TIBCO Rendezvous messaging protocol may be used to receive control messages. The administration messages may originate from either the graphical user interface 30, the command line interface 28 or by an administration API (not shown).

The graphical user interface 30 may allow control messages to be sent using the TIBCO Rendezvous protocol to the record and replay daemon 22 (FIG. 1). The record and replay daemon 22 may run on the same hardware as the graphical user interface 30, or in the alternative, it may be run on a physically remote computer system.

The administration module 36 may receive instructions from the graphical user interface 30 or command line interface 28 that it passes to storage module 38 to retrieve previously created altered market data streams, modified in a manner that will be described in greater detail below, stored in data store 24 that are replayed by replay module 34 for transmission to client application under test 16. Alternately, administration module 36 may alter market data streams from market data system 12 by sending the transformation instructions to proxy server 26, so that real-time market data received by proxy server 26 from replay module 34 may be modified by the proxy server and sent to client application under test 16 in real time.

Figure 5:
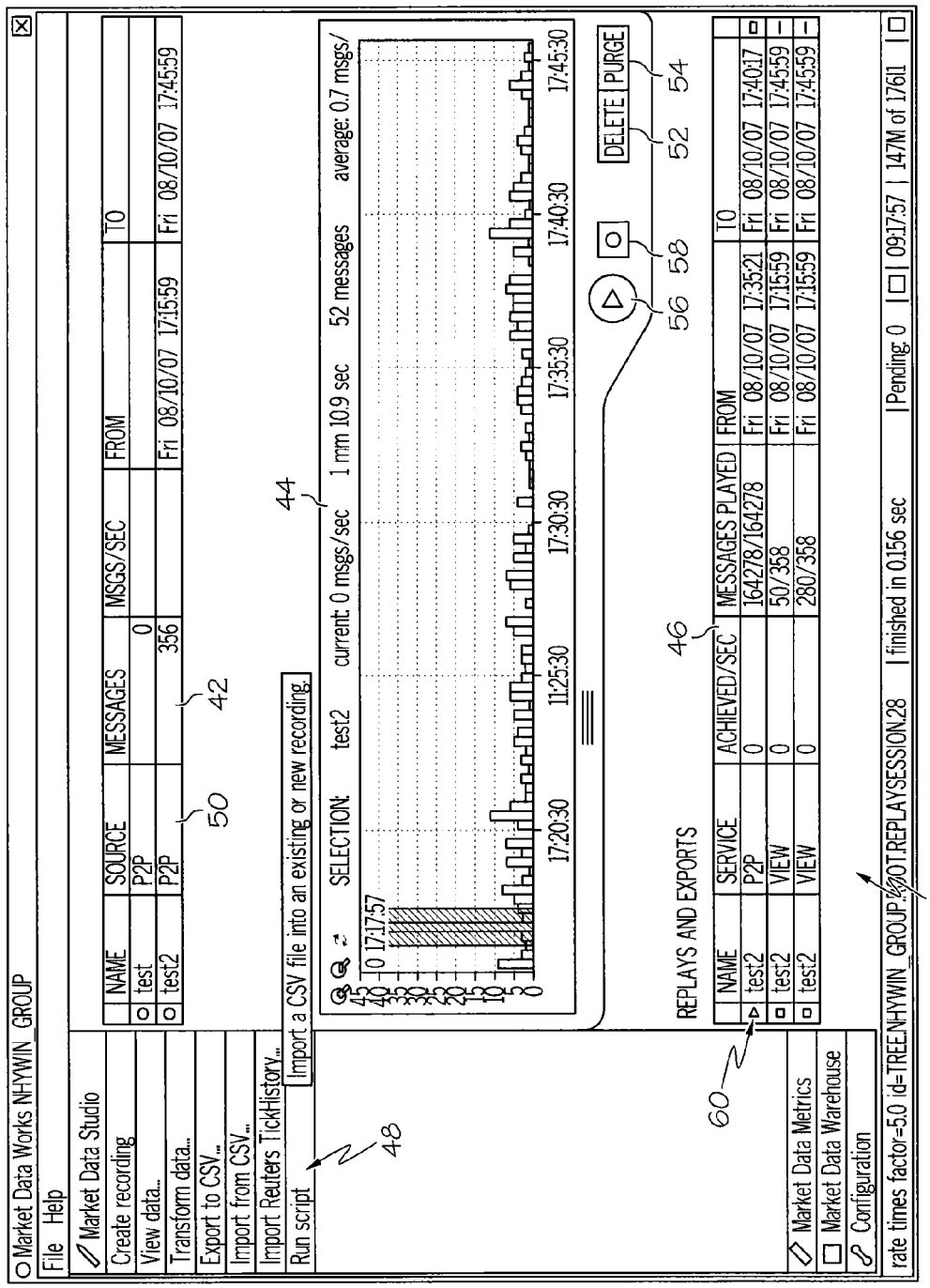
FIG. 5 is a screen shot generated by the graphical user interface of the market data simulator of FIG. 1 showing the main dialog panel.

As shown in FIG. 5, the graphical user interface 30 may include a main dialog screen panel 40. The main dialog panel 40 may include a recording area 42, a graphical area 44 that displays a data stream for transformation or replay, and a replay area 46. The main dialog panel 40 also may include a menu 48 of activities that can be performed with the tool. Preferably, the activities are wizard driven. The recording area 42 may display the recordings, either of data received from market data system 12 or of transformed market data, that have been made by the record module 32 (see FIG. 2) from data received from the market data system 12 and stored in data store 24.

The graphical area 44 may show data rates of the particular recording 50 highlighted in the recording area 42. The graphical area 44 may include a DELETE button 52 and a PURGE button 54. The PURGE button 54 may purge or truncate the oldest portion of a recording shown in window 44, for example, the last three hours of an eight hour recording. The DELETE button 52 may delete an entire recording displayed in window 44. Buttons 56, 58 are provided for starting and stopping replays and recordings, respectively. The graphical area also may enable a user to select periods within a recording for replay or modification.

The lower level 46 of the main dialog panel 40 may display replay sessions. For example, in row 60, the replay session named "test2" was received by way of a point-to-point ("P2P") service. 164,278 messages out of 164,278 messages were played from Friday, Aug. 10, 2007 at 5:35 p.m. and 21 seconds to 5:40 p.m. and 17 seconds.

Figure 4:
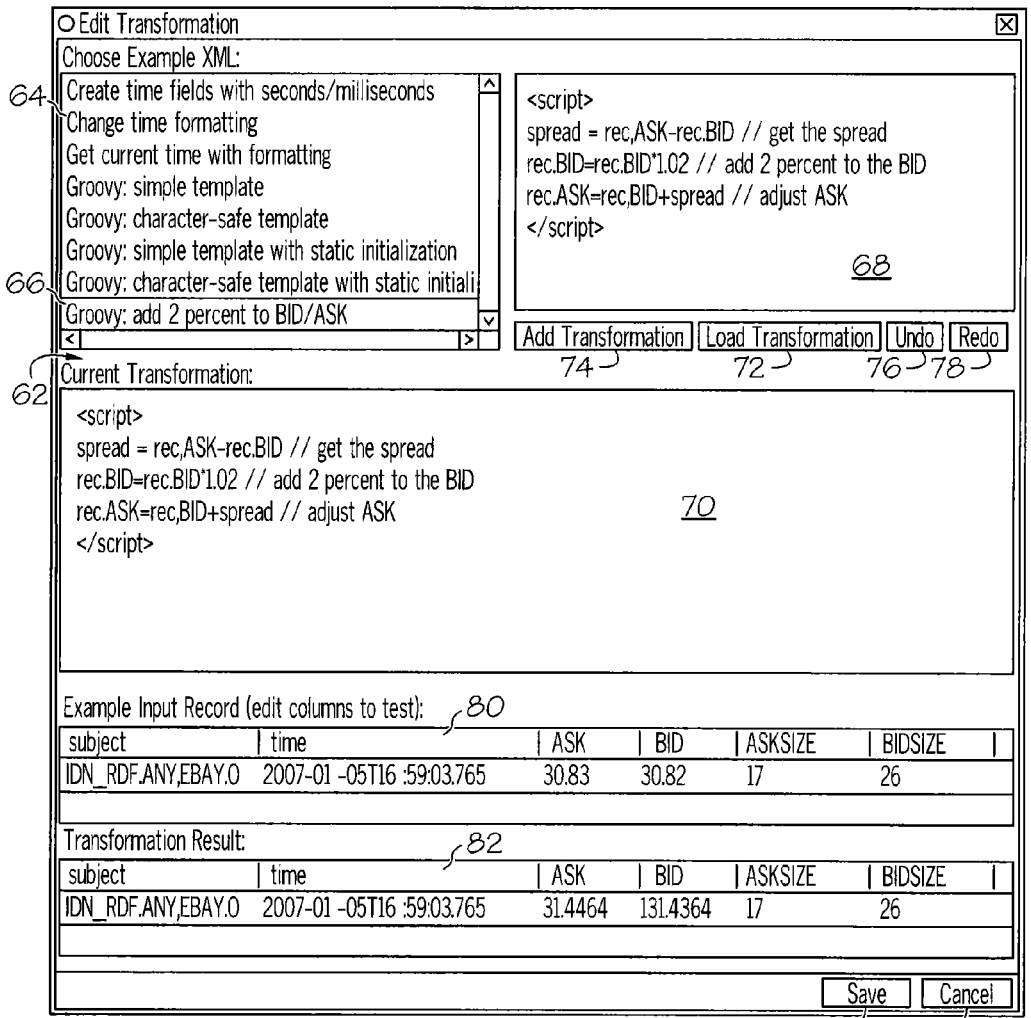
FIG. 4 is a screen shot produced by the graphical user interface of the market data simulator of FIG. 1 in which market data scenarios are contrived.

As shown in FIG. 4, the graphical user interface 30 may include a transformation screen 62 using Groovy language in which market data altering scenarios are contrived. The transformation screen 62 includes a "Choose Example XML" window 64 that displays a list of predetermined and stored scenarios for changing market data. For example, the Groovy script for the scenario 66, highlighted in window 64, named "Groovy: add two percent (2%) BID/ASK" is displayed in window 68. Accordingly, the instructions displayed in window 68 may be transmitted by the graphical user interface 30 (FIG. 2) to the administration module 36, which in turn may transmit the instructions either to replay module 34 or storage module 38.

In addition, a user may create a customized market data modification by typing script instructions in "Current Transformation" window 70. Transformation window 62 also may include a "Load Transformation" button 72, an "Add Example XML" button 74, an "Undo" button 76 and a "Redo" button 78. Preferably, the Load Transformation button 72 adds the selected transformation or change command stored within an external file to window 70. The external file may be stored in data store 24, elsewhere locally or over a network such as the Internet. The "Add Example XML" button 74 may allow a selected transformation in window 64, the script of which is displayed in window 68, to be added to window 70, as shown in FIG. 4. The "Undo" and "Redo" buttons 76, 78, respectively, enable a user to undo a transformation or resend a transformation to the administration module 36 and add and remove the transformation from window 70.

Transformation screen 62 also may include a row 80 that displays the example input record of data to be modified and a row 82 that contains data in fields that has been modified by the command in window 70 or 68. As shown in FIG. 4, the transformation added from window 64 and displayed in window 70 has modified the ask price of $30.83 to $31.4464, and the bid price of $30.82 to $31.4364. Both rows 80, 82 display the subject ("IDN_RDF.ANY.EBAY.O") and the time at which the price was taken (2007-01-05T 16:59:03.765). The transformation screen 62 also may include buttons 84, 86 for saving the transformed data in data store 24, or canceling the transformation of the selected data shown in window 70. When saved, a user is asked by GUI 30 to give the transformation a specific name for ease of later recall.

As shown in FIG. 3, a transformation screen 88 using XML language (although it is within the scope of the disclosure to use a variety of different languages) is shown. In transformation screen 88, a window 90 may display a listing of subfolders, each containing files of predetermined transformations or changes of market data received from market data system 12 and transmitted to the graphical user interface 30 through record module 32 and administration module 36 (see FIG. 2). The specific transformation highlighted in window 90 may be set out in window 92. A user may create a transformation by keying in script in edit window 94.

A "Load Transformation" button 96 may be located beneath window 92 and when clicked, may allow a user to load a specific transformation stored in an external file, in a manner similar to the "Load Transformation" button 72 of FIG. 4, and apply that transformation to window 94. A user may select a transformation from window 90, the script of which is displayed in window 92. When clicked, the "Add Transformation" button 98 then adds the transformation highlighted in window 90 to the transformation edit window 94. Changes to a transformation in the transformation edit window 94 may be removed by clicking the "Undo" button 100. Window 102 may display samples of market data received and stored in data store 24. Window 104 may display the individual segments of the data stream that have been transformed and stored in data store 24. "Save" button 106 and "Cancel" button 108 are used to save or cancel a particular transformation definition. The transformations created or added in screens 62, 88 of FIGS. 4 and 3, respectively, are applied to recorded market data using the "Run script" wizard of menu 48 of main dialog panel 40 (FIG. 5).

The main dialog panel 40 in FIG. 5 may be used to perform the following functions: start a replay of stored market data in data store 24, stop a replay of stored market data, fast forward a replay, pause a replay, inject error conditions (i.e., of feed down, stale data and other system errors) in a replay, view recorded data in data store 24, manipulate the recorded data and send the manipulated data interleaved with recorded data to the replay module 34, start a recording by record module 32, stop a recording by the record module and delete a recording stored in data store 24.

The manipulation of recorded data, as mentioned previously, may be accomplished by opening screens 62 or 88 to perform a desired manipulation of market data. In addition, error conditions may be injected by calling market data to a grid, created for example by Excel, modifying the data to include the error condition, and injecting the modified data into the replay stream. Alternatively, the grid may be used to inject script directly into the replay stream.

The command line interface 28 (see FIG. 2) provides a one-for-one equivalent function for each command available in the GUI. This command line interface is provided in the form of a shell window that communicates with the record and replay daemon 22 in the same manner as the graphical user interface 30. As in the case of the graphical user interface 30, the shell sends TIBCO Rendezvous messages to the administration module 36 of the record and replay daemon 22 (see FIG. 2).

In an embodiment, the proxy server 26 (see FIG. 1) may provide point-to-point transmission of data to a client application under test 16. In an embodiment, the proxy server 26 may implement the point-to-point semantics of market data platform such as the Reuters Market Data System.

Accordingly, in various embodiments, the disclosed method and system for developing and applying market data scenarios provides the ability to: record market data from a market data distribution platform to form a baseline from which to contrive scenarios, view and chart recorded data, apply functions to recorded data to contrive scenarios, speed up or slow down replay of a recorded scenario, introduce custom updates into a recorded stream, introduce error conditions within a recorded stream, pause, single-step and restart a stream, drag and drop a chart of data to form a new scenario, automate application of tests, allow arbitrary modifications of the data stream via programmatic means, store large volumes of recorded data, and mimic a market data distribution platform when replaying market data streams into applications.

In one aspect, the disclosed method and system simulate the output of a market data platform or service by changing the data content received from a commercially available market data service to incorporate contrived market scenarios. The changed market data then may be transmitted to a client application and the client application may process the changed market data as if it were actual market data transmitted directly from the market data distribution platform. The method provides asset-specific transformations of the data, so that specific transformations may be employed by a user, or a user may create his or her own transformations of data.

In a preferred embodiment, the method may include the steps of receiving market data from a market data distribution platform, storing the received market data, replaying the stored market data and changing the stored market data with respect to at least one specific field included in the market data by applying in an automated manner a market activity scenario to the stored market data. This modification may include entering parameters directed to the specific field, whereby the value of the specific field is changed from that in the stored received market data. After having been altered in this fashion, the altered market data then may be transmitted to a client application. With this embodiment, it is possible to apply specific market scenarios, and thereby test trading and other market data consuming applications, in off hours when the market being studied is closed.

The aforementioned method may be accomplished by the disclosed system, which may include a recording module for receiving a stream of market data over a network from a market data distribution platform, a user interface module that enables a user to specify changes to the market data stream to form a stream of altered market data and a client application interface for transmitting the stream of altered market data to a client application, whereby the stream of altered market data mimics the market data stream from the market data distribution platform. The client application may process the stream of altered market data as if it were market data from the market data distribution platform. In a preferred embodiment, the system may include a data store for storing market data, market data altered by the system and specific market data altering scenarios.

While the forms of apparatus and methods herein described constitute preferred embodiments of this invention, it is to be understood that the invention is not limited to these precise forms of apparatus and methods, and that changes may be made therein without departing from the scope of the invention.

What is claimed is:

1. A method for developing and applying market data scenarios, the method comprising:
   providing a computer system;
   receiving by a record and replay daemon operating on the computer system market data from a market data distribution platform;
   storing the received market data in a data store operating on the computer system;
   replaying the stored market data by the record and replay daemon;
   changing the stored received market data by the record and replay daemon system with respect to at least one specific asset included in the market data by applying in an automated manner a contrived market activity scenario, not reflective of actual market activity, to the stored received market data with respect to the at least one specific asset, including entering at least one parameter directed to the at least one specific asset, whereby performance of the at least one specific asset is changed from performance of the at least one specific asset in the stored received market data to a contrived performance of the at least one specific asset, the contrived market activity scenario being selected from a plurality of different contrived market activity scenarios stored on the computer system, whereby at least one value of the at least one stored specific asset is changed to simulate market activity desired by a user to create contrived market data with respect to the at least one specific asset;
   wherein changing the stored market data by the record and replay daemon operating on the computer system includes changing the stored market data by one or more of accelerating or decelerating an update rate, pausing and inserting custom updates, injecting error conditions, manipulating an overall update stream programmatically, adjusting a yield for a set of bonds, shifting foreign exchange rates, shifting equity prices, and shifting options; and
   transmitting by the record and replay daemon the contrived market data with respect to the at least one specific asset to a client application, whereby the client application processes the contrived market data with respect to the at least one specific asset as if it were market data transmitted directly from the market data distribution platform.

2. The method of claim 1, wherein changing the stored market data includes creating the plurality of different stored contrived market activity scenarios by a user on a user interface operating on the computer system.

3. The method of claim 1, further comprising storing a plurality of snapshots of a complete market data record from the market data distribution platform on the data store; and transmitting the stored snapshots of the complete market data record on the data store to client applications, such that the client applications use the transmitted snapshots to initialize themselves.

4. The method of claim 1, wherein providing a computer system includes providing includes providing a market data simulator having the record and replay daemon, the data store, and a proxy server; and wherein the record and replay daemon communicates with the proxy server, and the proxy server communicates with the client application.

5. The method of claim 4, wherein providing a market data simulator includes providing a market data simulator for receiving the market data in a stream of market data in real time from the market data distribution platform.

6. The method of claim 1, wherein transmitting by the record and replay daemon includes replaying on demand the contrived market data to the client application.

7. The method of claim 1, wherein receiving by the record and replay daemon includes recording information from the market data distribution platform by a record module included in the record and replay daemon.

8. The method of claim 7, wherein recording information from the market data distribution platform by the record module includes recording update values and initial value records that are stored periodically in the data store.

9. The method of claim 8, wherein transmitting by the record and replay daemon includes replaying the contrived market data to the client application; and wherein replaying the contrived market data includes creating an entire record during the replaying.

10. A system for developing and applying market data scenarios, the system comprising:
    a computer system;
    a record and replay daemon operating on the computer system for receiving market data from a market data distribution platform;
    a storage device operating on the computer system for storing the market data received by the record and replay daemon;
    the record and replay daemon replaying the market data stored in the storage device;
    the record and replay daemon changing the market data stored in the storage device with respect to at least one specific asset included in the market data by applying in an automated manner a contrived market activity scenario, not reflective of actual market activity, to the stored market data with respect to the at least one specific asset, including entering at least one parameter directed to the at least one specific asset, whereby performance of the at least one specific asset is changed from performance of the at least one specific asset in the stored received market data to a contrived performance of the at least one specific asset, the contrived market activity scenario being selected from a plurality of different contrived market activity scenarios stored on the computer system, whereby at least one value of the at least one stored specific asset is changed to simulate market activity desired by a user of the computer system to create contrived market data with respect to the at least one specific asset;
    wherein the record and replay daemon changes the stored market data by one or more of accelerating or decelerating an update rate, pausing and inserting custom updates, injecting error conditions, manipulating an overall update stream programmatically, adjusting a yield for a set of bonds, shifting foreign exchange rates, shifting equity prices, and shifting options; and
    the record and replay daemon transmitting the contrived market data with respect to the at least one specific asset to a client application, whereby the client application processes the contrived market data with respect to the at least one specific asset as if it were market data transmitted directly from the market data distribution platform.

11. The system of claim 10, further comprising a user interface operating on the computer system; and wherein the record and replay daemon changes the stored market data by creating the plurality of different stored contrived market activity scenarios by a user on the user interface.

12. The system of claim 11, wherein the storage device stores a plurality of snapshots of a complete market data record from the market data distribution platform; and the record and replay daemon transmits the stored snapshots of the complete market data record to client applications, such that the client applications use the transmitted snapshots to initialize themselves.

13. The system of claim 10, further comprising a market data simulator having the record and replay daemon, the data store, and a proxy server; and wherein the record and replay daemon communicates with the proxy server, and the proxy server communicates with the client application.

14. The system of claim 13, wherein the market data simulator receives the market data in a stream of market data in real time from the market data distribution platform.

15. The system of claim 10, wherein the record and replay daemon replays on demand the contrived market data to the client application.

16. The system of claim 15, wherein the record and replay daemon records information from the market data distribution platform by a record module included in the record and replay daemon.

17. The system of claim 16, wherein the record module records update values and initial value records that are stored periodically in the data store.

18. The system of claim 17, wherein the record and replay daemon creates an entire record during the replay on demand.

* * * * *